(12) United States Patent
Hockaday et al.

(10) Patent No.: US 10,358,936 B2
(45) Date of Patent: Jul. 23, 2019

(54) BOWED ROTOR SENSOR SYSTEM

(71) Applicant: United Technologies Corporation, Farmington, CT (US)

(72) Inventors: Bruce Hockaday, Vernon, CT (US); Charles W. Haldeman, Simsbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 427 days.

(21) Appl. No.: 15/201,716

(22) Filed: Jul. 5, 2016

(65) Prior Publication Data
US 2018/0010480 A1    Jan. 11, 2018

(51) Int. Cl.
| F01D 19/02 | (2006.01) |
| F01D 21/06 | (2006.01) |
| F01D 5/12 | (2006.01) |
| F01D 11/08 | (2006.01) |
| F01D 21/00 | (2006.01) |
| F02C 7/26 | (2006.01) |
| G01B 21/16 | (2006.01) |
(Continued)

(52) U.S. Cl.
CPC ........... *F01D 21/06* (2013.01); *F01D 5/12* (2013.01); *F01D 11/08* (2013.01); *F01D 21/003* (2013.01); *F01D 25/34* (2013.01); *F02C 7/26* (2013.01); *F02C 7/262* (2013.01); *G01B 21/16* (2013.01); *F05D 2220/32* (2013.01); *F05D 2260/85* (2013.01); *F05D 2270/304* (2013.01); *F05D 2270/804* (2013.01)

(58) Field of Classification Search
CPC .......... F01D 11/08; F01D 11/22; F01D 11/24; F01D 21/008; F01D 19/02
See application file for complete search history.

(56) References Cited

U.S. PATENT DOCUMENTS

| 1,951,875 A | 3/1934 | Laabs |
| 2,617,253 A | 11/1952 | Fusner et al. |
(Continued)

FOREIGN PATENT DOCUMENTS

| EP | 1396611 | 3/2004 |
| EP | 1533479 A2 | 5/2005 |
(Continued)

OTHER PUBLICATIONS

EP Application No. 17155584 Extended European Search Report dated Jul. 6, 2017, 9 pages.
(Continued)

*Primary Examiner* — Ninh H. Nguyen
(74) *Attorney, Agent, or Firm* — Cantor Colburn LLP

(57) ABSTRACT

According to an aspect, a bowed rotor sensor system for a gas turbine engine is provided. The bowed rotor sensor system includes a bowed rotor sensor operable to transmit a sensing field in an observation region and receive a signal indicative of a gap between an air seal and a blade tip within the gas turbine engine. The bowed rotor sensor system also includes a controller operable to monitor a plurality of gap data from the bowed rotor sensor indicative of the gap between the air seal and the blade tip of a plurality of blades passing through the observation region and determine a bowed rotor status of the gas turbine engine based on the gap data.

20 Claims, 4 Drawing Sheets

(51) Int. Cl.
  *F01D 25/34* (2006.01)
  *F02C 7/262* (2006.01)

(56) References Cited

U.S. PATENT DOCUMENTS

| | | |
|---|---|---|
| 2,962,597 A | 11/1960 | Evans |
| 3,057,155 A | 10/1962 | Rizk |
| 3,151,452 A | 10/1964 | Bunger et al. |
| 3,290,709 A | 12/1966 | Whitenack, Jr. et al. |
| 3,360,844 A | 1/1968 | Wonneman |
| 3,764,815 A | 10/1973 | Habock et al. |
| 3,793,905 A | 2/1974 | Black et al. |
| 3,898,439 A | 8/1975 | Reed et al. |
| 3,951,008 A | 4/1976 | Schneider et al. |
| 4,044,550 A | 8/1977 | Vermilye |
| 4,069,424 A | 1/1978 | Burkett |
| 4,120,159 A | 10/1978 | Matsumoto et al. |
| 4,144,421 A | 3/1979 | Sakai |
| 4,302,813 A | 11/1981 | Kurihara et al. |
| 4,353,604 A | 10/1982 | Dulberger et al. |
| 4,380,146 A | 4/1983 | Yannone et al. |
| 4,426,641 A | 1/1984 | Kurihara et al. |
| 4,435,770 A | 3/1984 | Shiohata et al. |
| 4,437,163 A | 3/1984 | Kurihara et al. |
| 4,453,407 A | 6/1984 | Sato et al. |
| 4,485,678 A | 12/1984 | Fanuele |
| 4,488,240 A | 12/1984 | Kapadia et al. |
| 4,496,252 A | 1/1985 | Horler et al. |
| 4,598,551 A | 7/1986 | Dimitroff, Jr. et al. |
| 4,627,234 A | 12/1986 | Schuh |
| 4,642,782 A | 2/1987 | Kemper et al. |
| 4,669,893 A | 6/1987 | Chalaire et al. |
| 4,713,985 A | 12/1987 | Ando |
| 4,733,529 A | 3/1988 | Nelson et al. |
| 4,747,270 A | 5/1988 | Klie et al. |
| 4,854,120 A | 8/1989 | Nelson et al. |
| 4,979,362 A | 12/1990 | Vershure, Jr. |
| 5,103,629 A | 4/1992 | Mumford et al. |
| 5,123,239 A | 6/1992 | Rodgers |
| 5,127,220 A | 7/1992 | Jesrai et al. |
| 5,174,109 A | 12/1992 | Lampe |
| 5,184,458 A | 2/1993 | Lampe et al. |
| 5,201,798 A | 4/1993 | Hogan |
| 5,349,814 A | 9/1994 | Ciokajlo et al. |
| 6,146,090 A | 11/2000 | Schmidt |
| 6,168,377 B1 | 1/2001 | Wolfe et al. |
| 6,190,127 B1 | 2/2001 | Schmidt |
| 6,318,958 B1 | 11/2001 | Giesler et al. |
| 6,478,534 B2 | 11/2002 | Bangert et al. |
| 6,498,978 B2 | 12/2002 | Leamy et al. |
| 6,517,314 B1 | 2/2003 | Burnett et al. |
| 6,558,118 B1 | 5/2003 | Brisson et al. |
| 6,681,579 B2 | 1/2004 | Lane et al. |
| 6,762,512 B2 | 7/2004 | Nelson |
| 7,104,072 B2 | 9/2006 | Thompson |
| 7,133,801 B2 | 11/2006 | Song |
| 7,409,319 B2 * | 8/2008 | Kant ............... F01D 21/003 702/188 |
| 7,428,819 B2 | 9/2008 | Cataldi et al. |
| 7,507,070 B2 | 3/2009 | Jones |
| 7,543,439 B2 | 6/2009 | Butt et al. |
| 7,587,133 B2 | 9/2009 | Franke et al. |
| 7,742,881 B2 | 6/2010 | Muralidharan et al. |
| 7,798,720 B1 | 9/2010 | Walsh |
| 7,909,566 B1 | 3/2011 | Brostmeyer |
| 7,972,105 B2 | 7/2011 | Dejoris et al. |
| 8,090,456 B2 | 1/2012 | Karpman et al. |
| 8,291,715 B2 | 10/2012 | Libera et al. |
| 8,306,776 B2 | 11/2012 | Ihara et al. |
| 8,770,913 B1 | 7/2014 | Negron et al. |
| 8,776,530 B2 * | 7/2014 | Shirooni ............... F01D 25/08 60/39.091 |
| 8,820,046 B2 | 9/2014 | Ross et al. |
| 8,918,264 B2 | 12/2014 | Jegu et al. |
| 9,086,018 B2 | 7/2015 | Winston et al. |
| 9,121,309 B2 | 9/2015 | Geiger |
| 9,429,510 B2 * | 8/2016 | Belsom ............... G01N 17/04 |
| 9,664,070 B1 | 5/2017 | Clauson et al. |
| 9,699,833 B2 | 7/2017 | Broughton et al. |
| 9,845,730 B2 * | 12/2017 | Betti ............... F01D 25/34 |
| 9,988,928 B2 * | 6/2018 | Popescu ............... F01D 19/02 |
| 2002/0173897 A1 | 11/2002 | Leamy et al. |
| 2003/0145603 A1 | 8/2003 | Reed et al. |
| 2004/0065091 A1 | 4/2004 | Anderson |
| 2004/0131138 A1 | 7/2004 | Correia et al. |
| 2006/0032234 A1 | 2/2006 | Thompson |
| 2006/0260323 A1 | 11/2006 | Moulebhar |
| 2007/0031249 A1 | 2/2007 | Jones |
| 2007/0151258 A1 | 7/2007 | Gaines et al. |
| 2008/0072568 A1 | 3/2008 | Moniz et al. |
| 2009/0246018 A1 | 10/2009 | Kondo et al. |
| 2009/0301053 A1 | 12/2009 | Geiger |
| 2009/0314002 A1 | 12/2009 | Libera et al. |
| 2010/0095791 A1 | 4/2010 | Galloway |
| 2010/0132365 A1 | 6/2010 | Labala |
| 2010/0293961 A1 | 11/2010 | Tong et al. |
| 2010/0326085 A1 | 12/2010 | Veilleux |
| 2011/0077783 A1 | 3/2011 | Karpman et al. |
| 2011/0146276 A1 | 6/2011 | Sathyanarayana et al. |
| 2011/0153295 A1 | 6/2011 | Yerramalla et al. |
| 2011/0296843 A1 | 12/2011 | Lawson, Jr. |
| 2012/0031067 A1 | 2/2012 | Sundaram et al. |
| 2012/0240591 A1 | 9/2012 | Snider et al. |
| 2012/0266601 A1 | 10/2012 | Miller |
| 2012/0316748 A1 | 12/2012 | Jegu et al. |
| 2013/0031912 A1 | 2/2013 | Finney et al. |
| 2013/0091850 A1 | 4/2013 | Francisco |
| 2013/0101391 A1 | 4/2013 | Szwedowicz et al. |
| 2013/0134719 A1 | 5/2013 | Watanabe et al. |
| 2013/0251501 A1 | 9/2013 | Araki et al. |
| 2014/0060076 A1 | 3/2014 | Cortelli et al. |
| 2014/0123673 A1 | 5/2014 | Mouze et al. |
| 2014/0199157 A1 | 7/2014 | Haerms et al. |
| 2014/0236451 A1 | 8/2014 | Gerez et al. |
| 2014/0241878 A1 | 8/2014 | Herrig et al. |
| 2014/0271152 A1 | 9/2014 | Rodriguez |
| 2014/0301820 A1 | 10/2014 | Lohse et al. |
| 2014/0318144 A1 | 10/2014 | Lazzeri et al. |
| 2014/0334927 A1 | 11/2014 | Hammerum |
| 2014/0366546 A1 | 12/2014 | Bruno et al. |
| 2014/0373518 A1 | 12/2014 | Manneville et al. |
| 2014/0373552 A1 | 12/2014 | Zaccaria et al. |
| 2014/0373553 A1 | 12/2014 | Zaccaria et al. |
| 2014/0373554 A1 | 12/2014 | Pech et al. |
| 2015/0016949 A1 | 1/2015 | Smith |
| 2015/0115608 A1 | 4/2015 | Draper |
| 2015/0121874 A1 | 5/2015 | Yoshida et al. |
| 2015/0128592 A1 | 5/2015 | Filiputti et al. |
| 2015/0159625 A1 | 6/2015 | Hawdwicke, Jr. et al. |
| 2015/0219121 A1 | 8/2015 | King |
| 2015/0377141 A1 | 12/2015 | Foiret |
| 2016/0236369 A1 | 8/2016 | Baker |
| 2016/0245312 A1 | 8/2016 | Morice |
| 2016/0265387 A1 | 9/2016 | Duong et al. |
| 2016/0288325 A1 | 10/2016 | Naderer et al. |
| 2017/0030265 A1 | 2/2017 | O'Toole et al. |
| 2017/0218848 A1 | 8/2017 | Alstad et al. |
| 2017/0233103 A1 | 8/2017 | Teicholz et al. |
| 2017/0234158 A1 | 8/2017 | Savela |
| 2017/0234166 A1 | 8/2017 | Dube et al. |
| 2017/0234167 A1 | 8/2017 | Stachowiak et al. |
| 2017/0234230 A1 | 8/2017 | Schwarz et al. |
| 2017/0234231 A1 | 8/2017 | Virtue, Jr. et al. |
| 2017/0234232 A1 | 8/2017 | Sheridan et al. |
| 2017/0234233 A1 | 8/2017 | Schwarz et al. |
| 2017/0234235 A1 | 8/2017 | Pech |
| 2017/0234236 A1 | 8/2017 | Feulner et al. |
| 2017/0234238 A1 | 8/2017 | Schwarz et al. |
| 2018/0265223 A1 | 9/2018 | Teicholz et al. |
| 2018/0274390 A1 | 9/2018 | Clauson et al. |
| 2018/0327117 A1 | 11/2018 | Teicholz et al. |

(56) References Cited

U.S. PATENT DOCUMENTS

FOREIGN PATENT DOCUMENTS

| EP | 1862875 | 12/2007 |
| EP | 2006496 | 12/2008 |
| EP | 2305986 | 4/2011 |
| EP | 2363575 A2 | 9/2011 |
| EP | 2871333 | 5/2015 |
| EP | 3051074 | 8/2016 |
| FR | 2933131 | 1/2010 |
| GB | 1374810 | 11/1974 |
| GB | 2117842 | 10/1983 |
| GB | 2218751 | 11/1989 |
| IN | 201408865 | 5/2015 |
| JP | 2002371806 | 12/2002 |
| JP | 2004036414 | 2/2004 |
| WO | 9900585 | 1/1999 |
| WO | 2013007912 | 1/2013 |
| WO | 2014152701 | 9/2014 |
| WO | 2015030946 | 3/2015 |
| WO | 2016069303 | 5/2016 |

OTHER PUBLICATIONS

EP Application No. 17155601 Extended European Search Report dated Jun. 30, 2017, 7 pages.
EP Application No. 17155612 Extended European Search Report dated Jul. 4, 2017, 8 pages.
EP Application No. 17155613 Extended European Search Report dated Jun. 27, 2017, 10 pages.
EP Application No. 17155683 Extended European Search Report dated Jun. 30, 2017, 8 pages.
EP Application No. 17155687 Extended European Search Report dated Jun. 16, 2017, 9 pages.
EP Application No. 17155698 Extended European Search Report dated Jun. 21, 2017, 9 pages.
EP Application No. 17155721 Extended European Search Report dated Jun. 27, 2017, 8 pages.
EP Application No. 17155793 Extended European Search Report dated Jun. 30, 2017, 10 pages.
EP Application No. 17155798 Extended European Search Report dated Jun. 30, 2017, 9 pages.
EP Application No. 17155807 Extended European Search Report dated Jul. 3, 2017, 8 pages.
EP Application No. 17155683 Office Action dated May 22, 2018, 2 pages.
U.S. Appl. No. 15/042,331 Non-Final Office Action dated Sep. 9, 2016, 37 pages.
Extended European Search Report for Application No. 17179407.6-1610 dated Dec. 5, 2017 (8 pp.).
EP Application No. 17155612.9 Office Action dated Oct. 2, 2018, 3 pages.
EP Application No. 17155698.8 Office Action dated Sep. 27, 2018, 3 pages.
EP Application No. 17155798.6 Office Action dated Sep. 21, 2018, 3 pages.

* cited by examiner

BOWED ROTOR SENSOR SYSTEM

BACKGROUND

This disclosure relates to gas turbine engines, and more particularly to a bowed rotor sensor system.

Gas turbine engines are used in numerous applications, one of which is for providing thrust to an aircraft. When a gas turbine engine of an aircraft has been shut off for example, after an aircraft has landed at an airport, the engine is hot and due to heat rise, the upper portions of the engine will be hotter than lower portions of the engine. When this occurs thermal expansion may cause deflection of components of the engine which may result in a "bowed rotor" condition. If a gas turbine engine is in such a "bowed rotor" condition it is undesirable to restart or start the engine.

Accordingly, it is desirable to provide a method and/or apparatus for detecting and monitoring a "bowed rotor" condition.

BRIEF DESCRIPTION

In one embodiment, a bowed rotor sensor system for a gas turbine engine is provided. The bowed rotor sensor system includes a bowed rotor sensor operable to transmit a sensing field in an observation region and receive a signal indicative of a gap between an air seal and a blade tip within the gas turbine engine. The bowed rotor sensor system also includes a controller operable to monitor a plurality of gap data from the bowed rotor sensor indicative of the gap between the air seal and the blade tip of a plurality of blades passing through the observation region and determine a bowed rotor status of the gas turbine engine based on the gap data.

In addition to one or more of the features described above, or as an alternative to any of the foregoing embodiments, further embodiments may include where the gap data modulates as a rotor including the blades rotates within the gas turbine engine based on a changing gap between the air seal and the blade tip of the blade.

In addition to one or more of the features described above, or as an alternative to any of the foregoing embodiments, further embodiments may include where the controller is operable to monitor an amplitude of modulation of the gap data to determine the bowed rotor status.

In addition to one or more of the features described above, or as an alternative to any of the foregoing embodiments, further embodiments may include where collection of the gap data is synchronized with respect to a once-per-revolution indicator of the rotor.

In addition to one or more of the features described above, or as an alternative to any of the foregoing embodiments, further embodiments may include where the bowed rotor sensor is installed in a borescope port of the gas turbine engine.

In addition to one or more of the features described above, or as an alternative to any of the foregoing embodiments, further embodiments may include where the observation region is aft of the borescope port.

In addition to one or more of the features described above, or as an alternative to any of the foregoing embodiments, further embodiments may include where the bowed rotor sensor is an optical, acoustic, or microwave sensor.

In addition to one or more of the features described above, or as an alternative to any of the foregoing embodiments, further embodiments may include where the controller is operable to compare the gap data to a baseline data set to determine the bowed rotor status and collect a time history of the gap data.

In addition to one or more of the features described above, or as an alternative to any of the foregoing embodiments, further embodiments may include where the controller is operable to control a starter of the gas turbine engine based on the bowed rotor status.

In addition to one or more of the features described above, or as an alternative to any of the foregoing embodiments, further embodiments may include where the controller is operable to control a core-turning motor of the gas turbine engine based on the bowed rotor status.

According to another embodiment, a method of bowed rotor sensing for a gas turbine engine includes transmitting a sensing field from a bowed rotor sensor to an observation region within the gas turbine engine and receiving a signal indicative of a gap between an air seal and a blade tip in the observation region. A controller monitors a plurality of gap data from the bowed rotor sensor indicative of the gap between the air seal and the blade tip of a plurality of blades passing through the observation region. A bowed rotor status of the gas turbine engine is determined based on the gap data.

In addition to one or more of the features described above, or as an alternative to any of the foregoing embodiments, further embodiments may include observing a modulation of the gap data as a rotor comprising the blades rotates within the gas turbine engine, the modulation indicative of a changing gap between the air seal and the blade tip of the blades.

In addition to one or more of the features described above, or as an alternative to any of the foregoing embodiments, further embodiments may include monitoring an amplitude of the modulation of the gap data to determine the bowed rotor status.

In addition to one or more of the features described above, or as an alternative to any of the foregoing embodiments, further embodiments may include comparing the gap data to a baseline data set to determine the bowed rotor status, and collecting a time history of the gap data.

In addition to one or more of the features described above, or as an alternative to any of the foregoing embodiments, further embodiments may include controlling a starter of the gas turbine engine based on the bowed rotor status.

In addition to one or more of the features described above, or as an alternative to any of the foregoing embodiments, further embodiments may include controlling a core-turning motor of the gas turbine engine based on the bowed rotor status.

A technical effect of the apparatus, systems and methods is achieved by using a bowed rotor sensor system for a gas turbine engine as described herein.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

Figure 1:
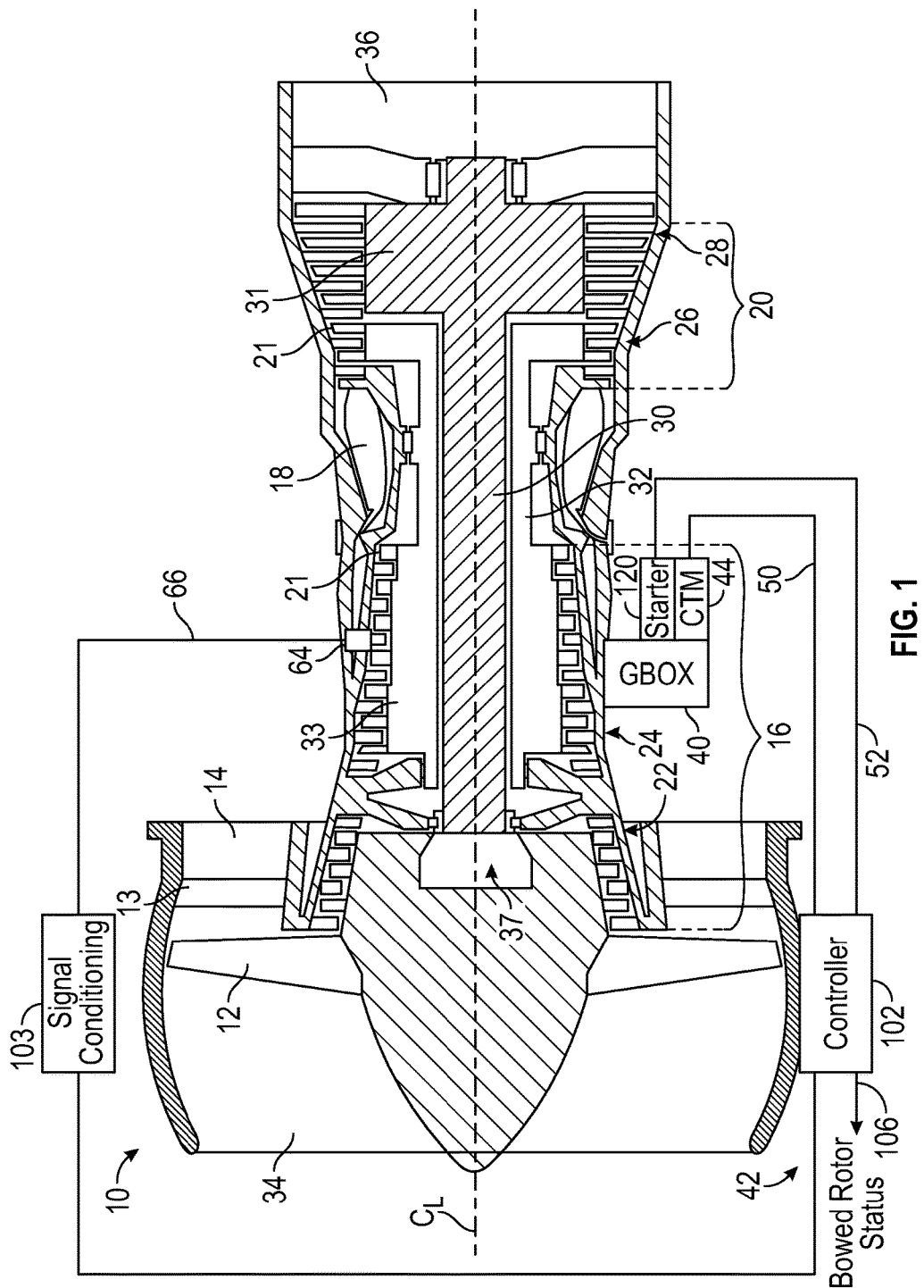
FIG. 1 is a cross-sectional view of a gas turbine engine including a bowed rotor sensor system.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present disclosure may include features and components not specifically shown in the drawings. Like reference numerals identify similar structural elements.

DETAILED DESCRIPTION

Various embodiments of the present disclosure are related to bowed rotor detection in a gas turbine engine. Embodiments detect a bowed rotor condition by using a bowed rotor sensor that can detect a gap between a blade tip and an air seal of a gas turbine engine. By monitoring gaps, variations between blades can be observed that are indicative of a bowed rotor condition. A mitigation action can be initiated, and the bowed rotor sensor can continue to be monitored for changes in gap size until a thermal equilibrium is reached and the gap size is deemed sufficient for the observed blades. In some embodiments, a core turning motor is used to drive rotation of the gas turbine engine for an initial bowed rotor condition assessment and/or until sensor data indicates that a bowed rotor condition has been mitigated or prevented. In some embodiments, a starter is used to drive rotation of the gas turbine engine for an initial bowed rotor condition assessment and/or until sensor data indicates that a bowed rotor condition has been mitigated or prevented as a dry motoring process.

Embodiments can use a controller, such as a full authority digital engine control (FADEC), to drive a core turning motor (CTM) and/or a starter to mitigate a bowed rotor condition of the gas turbine engines. The controller can provide a bowed rotor status (e.g., successful/unsuccessful bowed rotor reduction) that is transmitted to or readable by other systems, for instance, a test stand, a maintenance system, a cockpit indicator, and the like. If a pass status is determined, the controller may continue with normal engine starting operation. The controller can shut down bowed rotor mitigation based on detecting that a bowed rotor condition is not present, a maximum time has elapsed, or another shutdown condition is detected, e.g., a pilot/maintenance request.

When dry motoring is used for bowed rotor mitigation, a starter valve can be actively adjusted to deliver air pressure from an air supply to an engine starting system that controls starting rotor speed. Dry motoring may be performed by running an engine starting system at a lower speed with a longer duration than typically used for engine starting while dynamically adjusting the starter valve to maintain the rotor speed and/or follow a dry motoring profile. Dry motoring is typically performed at a higher speed than bowed rotor prevention/mitigation performed by the CTM. Some embodiments increase the rotor speed of the starting spool to approach a critical rotor speed gradually and as thermal distortion (observed by the bowed rotor sensor) is decreased the starting spool then accelerates beyond the critical rotor speed to complete the engine starting process. The critical rotor speed refers to a major resonance speed where, if the temperatures are unhomogenized, the combination of a bowed rotor and similarly bowed casing and the resonance would lead to high amplitude oscillation in the rotor and high rubbing of blade tips on one side of the rotor, especially in the high pressure compressor if the rotor is straddle-mounted.

Various embodiments of this disclosure may be applied on any turbomachinery component that requires cooling after shutdown. For example, gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

Gas turbine engines provide efficient, reliable power for a wide range of applications, including aviation and industrial power generation. Smaller-scale engines such as auxiliary power units typically utilize a one-spool design, with co-rotating compressor and turbine sections. Larger-scale jet engines and industrial gas turbines are generally arranged into a number of coaxially nested spools, which operate at different pressures and temperatures, and rotate at different speeds.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Aviation applications include turbojet, turbofan, turboprop and turboshaft engines. In turbojet engines, thrust is generated primarily from the exhaust. Modern fixed-wing aircraft generally employ turbofan and turboprop designs, in which the low pressure spool is coupled to a propulsion fan or propeller. Turboshaft engines are typically used on rotary-wing aircraft, including helicopters.

Turbofan engines are commonly divided into high and low bypass configurations. High bypass turbofans generate thrust primarily from the fan, which drives airflow through a bypass duct oriented around the engine core. This design is common on commercial aircraft and military transports, where noise and fuel efficiency are primary concerns. Low bypass turbofans generate proportionally more thrust from the exhaust flow, providing greater specific thrust for use on high-performance aircraft, including supersonic jet fighters. Unducted (open rotor) turbofans and ducted propeller engines are also known, in a variety of counter-rotating and aft-mounted configurations.

Referring now to FIG. 1, a cross-sectional view of a gas turbine engine 10, in a turbofan configuration is illustrated. The illustrated gas turbine engine 10 includes a propulsion fan 12 mounted inside a bypass duct 14 upstream of a fan exit guide vane 13. A power core of the engine is formed by a compressor section 16, a combustor 18 and a turbine section 20. Rotor blades (or airfoils) 21 in the compressor section 16 and/or the turbine section 20 may be subject to deflection or bowing if a thermal gradient forms after engine shutdown.

In the two-spool, high bypass configuration of FIG. 1, compressor section 16 includes a low pressure compressor 22 and a high pressure compressor 24. The turbine section 20 includes high a pressure turbine 26 and a low pressure turbine 28.

The low pressure compressor 22 is rotationally coupled to the low pressure turbine 28 via a low pressure shaft 30, thereby forming the low pressure spool or low spool 31. High pressure compressor 24 is rotationally coupled to the high pressure turbine 26 via a high pressure shaft 32, forming the high pressure spool or high spool 33 (also referred to as a starting spool).

During operation of the gas turbine engine 10, the fan 12 accelerates air flow from an inlet 34 through bypass duct 14, generating thrust. The core airflow is compressed in the low pressure compressor 22 and the high pressure compressor 24 and then the compressed airflow is mixed with fuel in the combustor 18 and ignited to generate combustion gas.

The combustion gas expands to drive the high and low pressure turbines 26 and 28, which are rotationally coupled to high pressure compressor 24 and low pressure compressor 22, respectively. Expanded combustion gases exit through exhaust nozzle 36, which is shaped to generate additional thrust from the exhaust gas flow.

In advanced turbofan designs, the low pressure shaft 30 may be coupled to fan 12 via geared drive mechanism 37, providing improved fan speed control for increased efficiency and reduced engine noise. Propulsion fan 12 may also function as a first-stage compressor for gas turbine engine 10, with low pressure compressor 22 performing as an intermediate-stage compressor or booster. Alternatively, the low pressure compressor stages are absent, and air from fan 12 is provided directly to high pressure compressor 24, or to an independently rotating intermediate compressor spool.

The gas turbine engine 10 may have a range of different shaft and spool geometries, including one-spool, two-spool and three-spool configurations, in both co-rotating and counter-rotating designs. Gas turbine engine 10 may also be configured as a low bypass turbofan, an open-rotor turbofan, a ducted or un-ducted propeller engine, or an industrial gas turbine.

An engine accessory gearbox 40 is mechanically coupled to a rotating portion of the gas turbine engine 10, such as the high pressure spool 33 (e.g., an engine core component). Rotation of various engine accessories can be driven through the engine accessory gearbox 40, such as pumps and electric generators. In embodiments, a core turning motor 44 can be coupled through the engine accessory gearbox 40 and may be integrally formed with an engine accessory, such as a starter 120. A bowed rotor sensor system 42 includes controller 102 and a bowed rotor sensor 64. The controller 102 may interface with the bowed rotor sensor 64 through signal conditioning circuitry 103 and signal path 66. The signal conditioning circuitry 103 may be located within a same housing as the controller 102 or located external to the controller 102. The signal conditioning circuitry 103 may perform electrical to optical, acoustic, or microwave signal conversions where the bow rotor sensor 64 is implemented as an optical, acoustic, or microwave sensor. The controller 102 may also control operation of the CTM 44 and/or starter 120 via signal paths 50, 52 based on sensor data received from the bowed rotor sensor 64. A bowed rotor status can be output from the controller 102 on a communication link 106 to indicate whether the controller 102 was able to successfully complete a bowed rotor mitigation process as confirmed using sensor data from the bowed rotor sensor 64.

The controller 102 may be implemented in a FADEC or another control of the gas turbine engine 10. The controller 102 includes memory to store instructions that are executed by one or more processors. The executable instructions may be stored or organized in any manner and at any level of abstraction, such as in connection with a controlling and/or monitoring operation of one or more systems of the gas turbine engine 10 of FIG. 1. The processors can be any type of central processing unit (CPU), including a general purpose processor, a digital signal processor, a microcontroller, an application specific integrated circuit (ASIC), a field programmable gate array, or the like. Also, in embodiments, the memory may include random access memory (RAM), read only memory (ROM), or other electronic, optical, magnetic, or any other computer readable medium onto which is stored data and control algorithms in a non-transitory form. The controller 102 can include multiple processing systems as separate channels.

Figure 2:
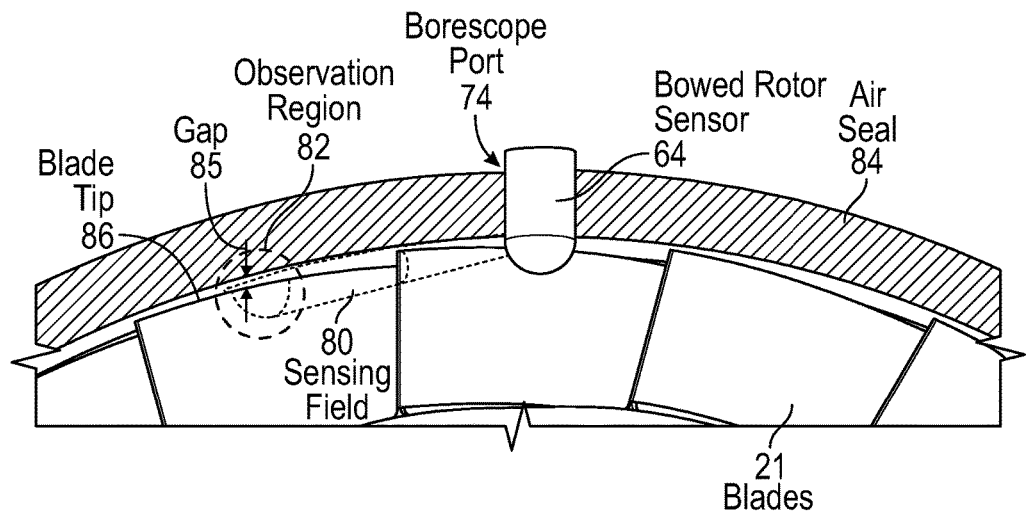
FIG. 2 is a perspective view of a bowed rotor sensor and observation region according to an embodiment of the disclosure.
Figure 3:
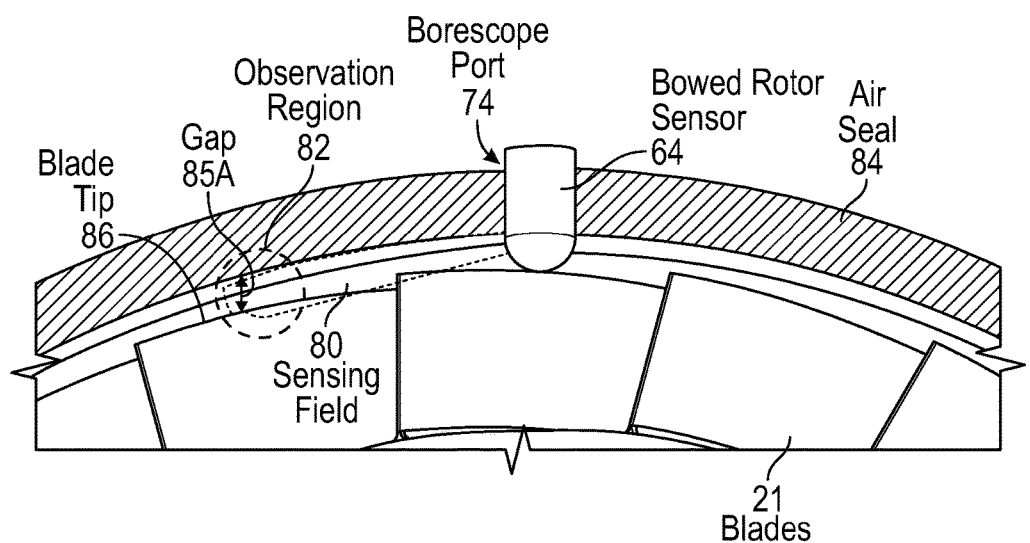
FIG. 3 is another perspective view of the bowed rotor sensor and observation region of FIG. 2 with a different gap size according to an embodiment of the disclosure.

FIGS. 2 and 3 illustrate operation of the bowed rotor sensor 64 according to an embodiment. The bowed rotor sensor 64 is operable to transmit a sensing field 80 in an observation region 82 and receive a signal indicative of a gap 85 between an air seal 84 and a blade tip 86 within the gas turbine engine 10. The bowed rotor sensor 64 "illuminates" the gap 85 and blade tip 86. The received signal can be reflected from the blade tip 86 is detected by a receiver in the bowed rotor sensor 64. The gap 85 can be characterized by a ratio of the received signal to the sensing field 80 transmitted.

The controller 102 of FIG. 1 is operable to monitor a plurality of gap data from the bowed rotor sensor 64 indicative of the gap 85 between the air seal 84 and the blade tip 86 of a plurality of blades 21 passing through the observation region 82 and determine a bowed rotor status of the gas turbine engine 10 based on the gap data. The gap data can modulate as a rotor comprising the blades 21 (such as high spool 33 of FIG. 1) rotates within the gas turbine engine 10 based on a changing of the gap 85 between the air seal 84 and the blade tip 86 of the blades 21. For instance, while a bowed rotor condition exists, the blade tip 86 of some of the blades 21 will be closer to the air seal 84 and others will be further away (e.g., less/non thermally distorted blades) having a larger gap 85A (FIG. 3). When the bow diminishes from reaching thermal equilibrium, the amplitude of modulation diminishes to an acceptable level allowing the gas turbine engine 10 to start. In some embodiments, the bowed rotor sensor 64 is installed in a borescope port 74 with the observation region 82 looking aft and entering into the gas path to view the air seal 84 and blade tip 86.

Figure 4:
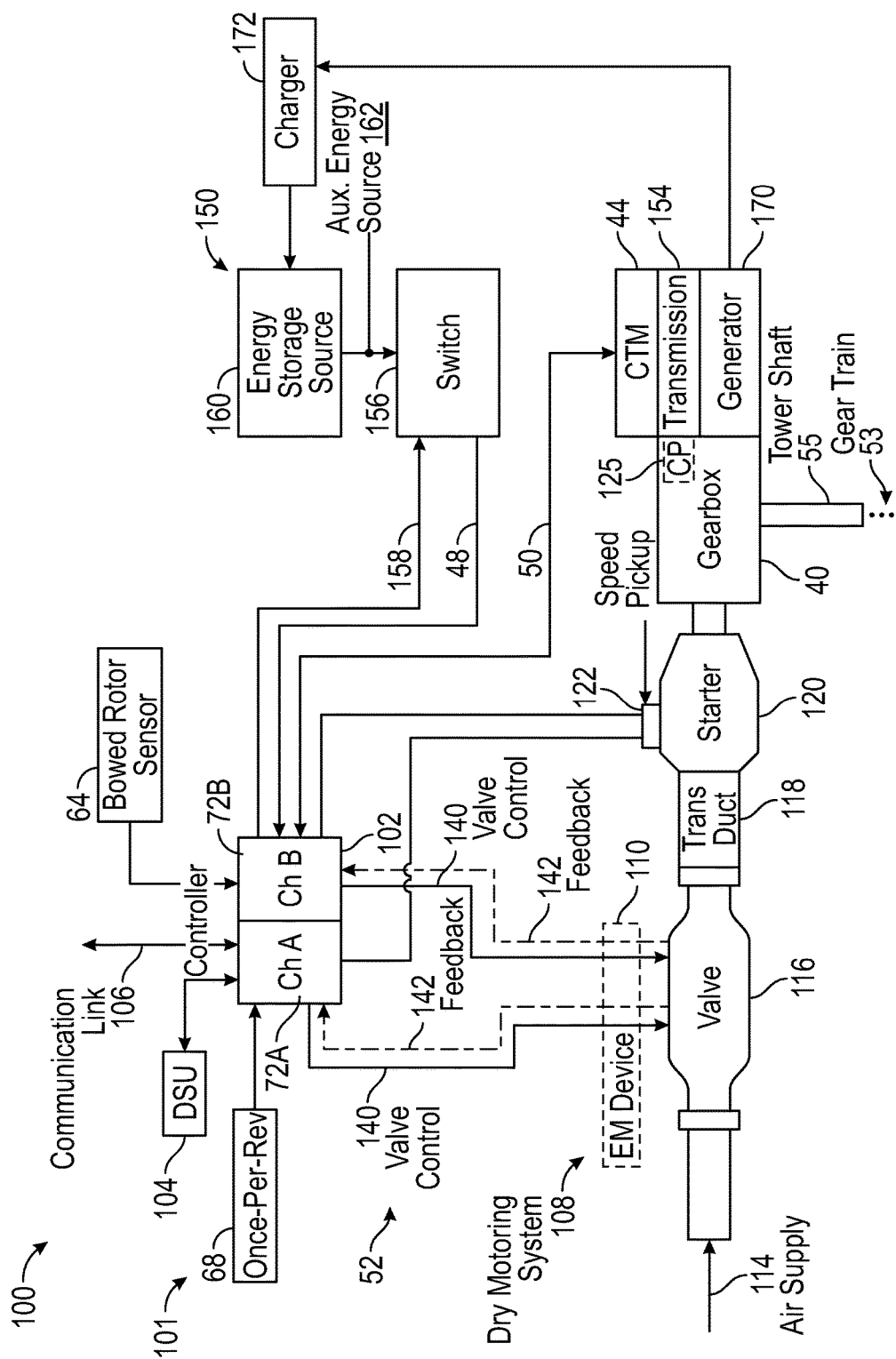
FIG. 4 is a block diagram of a system according to an embodiment of the disclosure.

Turning now to FIG. 4, a schematic of a starting system 100 for the gas turbine engine 10 of FIG. 1 is depicted according to an embodiment. The starting system 100 is also referred to generally as a gas turbine engine system. In the example of FIG. 4, the starting system 100 includes controller 102 with channel A 72A and channel B 72B. The starting system 100 can also include a data storage unit (DSU) 104 that retains data between shutdowns of the gas turbine engine 10 of FIG. 1. The DSU 104 includes non-volatile memory and retains data between cycling of power to the controller 102 and DSU 104. The communication link 106 can include an aircraft and/or test stand communication bus to interface with aircraft controls, e.g., a cockpit, various onboard computer systems, and/or a test stand.

A dry motoring system 108 is operable to drive rotation of a starting spool (e.g., high spool 33) of the gas turbine engine 10 of FIG. 1. Either or both channels 72A, 72B of controller 102 can alternate on and off commands to an electromechanical device 110 which may be coupled to a starter valve 116 to achieve a partially open position of the starter valve 116 to control a flow from a starter air supply 114 (also referred to as air supply 114) through a transfer duct 118 to an air turbine starter 120 (also referred to as starter 120 or pneumatic starter motor 120) to drive rotation of a starting spool of the gas turbine engine 10 below an engine idle speed. The air supply 114 (also referred to as starter air supply 114) can be provided by any known source of compressed air, such as an auxiliary power unit or ground cart.

The controller 102 can monitor a speed sensor, such as speed pickup 122 that may sense the speed of the engine rotor through its connection to gearbox 40 which is in turn connected to the high spool 33 via tower shaft 55 through gear train 53 (e.g., rotational speed of high spool 33) or any other such sensor for detecting or determining the speed of the gas turbine engine 10 of FIG. 1. The starter 120 may be coupled to the gearbox 40 of the gas turbine engine 10 of FIG. 1 directly or through a transmission such as a clutch system. The controller 102 can establish a control loop with respect to rotor speed to adjust positioning of the starter valve 116.

The starter valve 116 may be designed as an on/off valve which is typically commanded to either fully opened or fully closed. However, there is a time lag to achieve the fully open position and the fully closed position. By selectively alternating an on-command time with an off-command time through the electromechanical device 110, intermediate positioning states (i.e., partially opened/closed) can be achieved. The controller 102 can modulate the on and off commands (e.g., as a duty cycle using pulse width modulation) to the electromechanical device 110 to further open the starter valve 116 and increase a rotational speed of the starting spool of the gas turbine engine 10 of FIG. 1. In an embodiment, the electromechanical device 110 has a cycle time defined between an off-command to an on-command to the off-command that is at most half of a movement time for the starter valve 116 to transition from fully closed to fully open. Pneumatic lines or a mechanical linkage (e.g., via valve control 140) can be used to drive the starter valve 116 between the open position and the closed position. The electromechanical device 110 can be a solenoid that positions the starter valve 116 based on intermittently supplied electric power as commanded by the controller 102. In an alternate embodiment, the electromechanical device 110 is an electric valve controlling muscle air to adjust the position of the starter valve 116 as commanded by the controller 102.

Rather than using an electromechanical device 110 coupled to the starter valve 116 to achieve a partially open position of the starter valve 116, the dry motoring system 108 can use a variable position starter valve as the starter valve 116. Either or both channels of controller 102 can output a valve control signal 140 operable to dynamically adjust a valve angle of the starter valve 116 that selectively allows a portion of the air supply 114 to pass through the starter valve 116 and transfer duct 118 to air turbine starter 120. The starter valve 116 can be a continuous/infinitely adjustable valve that can hold a commanded valve angle, which may be expressed in terms of a percentage open/closed and/or an angular value (e.g., degrees or radians). Performance parameters of the starter valve 116 can be selected to meet dynamic response requirements of the starting system 100.

In some embodiments, the controller 102 can monitor a valve angle of the starter valve 116 using valve angle feedback signals 142 provided to both channels 72A, 72B of controller 102. As one example, in an active/standby configuration, both channels 72A, 72B of the controller 102 can use the valve angle feedback signals 142 to track a current valve angle, while only one channel 72A or 72B designated as an active channel outputs valve control signal 140. Upon a failure of the active channel, the standby channel of controller 102 can take over as the active channel to output valve control signal 140. In an alternate embodiment, both channels 72A, 72B of controller 102 output all or a portion of a valve angle command simultaneously on the valve control signals 140. The controller 102 can establish an outer control loop with respect to rotor speed and an inner control loop with respect to the valve angle of the starter valve 116.

The starting system 100 can also include a core-turning motoring system 150 (also referred to as an auxiliary drive system) that includes CTM 44 that is operable to drive rotation of the starting spool (e.g., high spool 33) of the gas turbine engine 10 of FIG. 1 through gearbox 40. A transmission 154 may be interposed between the CTM 44 and the gearbox 40 for reduction gearing and/or a clutch. The transmission 154 can interface with the gearbox 40 at a manual crank pad 125 location. In alternate embodiments, the transmission 154 interfaces with an alternate portion of the gearbox 40, and/or the transmission 154 is integrally formed with an accessory or the gearbox 40. The core-turning motoring system 150 also includes a switch 156 that may be commanded by either or both channels 72A, 72B of the controller 102 (e.g., using enable 158) to provide electrical power for the CTM 44. According to various embodiments, the switch 156 may be a mechanical switch, electrical relay, or other mechanism for controlling the distribution of electrical power to the core-turning motoring system 150. Electrical power may be provided from an energy storage source 160 and/or an auxiliary energy source 162, such as ground power or other aircraft/external source, as embodiments of an aircraft power source. The energy storage source 160 can be a battery or capacitor of an aircraft electrical system, which may be charged by a generator 170 through a charger 172. The generator 170 may be driven by the gearbox 40 (e.g., during operation of the gas turbine engine 10) or other source of rotational energy on the aircraft. Examples of the generator 170 include a permanent magnet alternator/generator, an integrated drive generator, a variable frequency generator, and other generator technologies known in the art.

In various embodiments, the core-turning motoring system 150 or the dry motoring system 108 can be used to prevent/mitigate a bowed rotor condition depending on the present operating characteristics of the gas turbine engine 10 of FIG. 1, for instance, as determined by the bowed rotor sensor 64. The controller 102 in combination with the dry motoring system 108 and/or the core-turning motoring system 150 may be collectively referred to as a bowed rotor prevention system 101 that is operable to prevent and/or mitigate a bowed rotor condition of the gas turbine engine 10 of FIG. 1. In an embodiment, the controller 102 is operable to engage the CTM 44 and drive rotation of the engine core of the gas turbine engine 10 of FIG. 1. The controller 102 may drive rotation of the CTM 44 until gap data received from the bowed rotor sensor 64 meets a modulation amplitude threshold or a shutoff request is detected based on one or more of: a detected opening of a nacelle of the gas turbine engine 10, a shutoff switch accessible to maintenance personnel on the nacelle or the gas turbine engine 10, a computer interface command on the aircraft, a detected fault condition, a time limit, a temperature limit, or a start command of the gas turbine engine 10 of FIG. 1. Rotation can be continuous or periodic based on time, sensed position, and/or gap characteristics.

In some embodiments, collection of gap data from the bowed rotor sensor 64 is synchronized with respect to a once-per-revolution indicator 68 of the rotor (e.g., during active rotation of the high spool 33 of FIG. 1). The once-per-revolution indicator 68 can also be used to track characteristics of specific blades 21. The controller 102 can compare the gap data to a baseline data set to determine the bowed rotor status and collect a time history of the gap data, for instance, in DSU 104. A time history of gap data may be later accessed by maintenance equipment for trending/fault prediction and/or used to adjust bowed rotor pass/fail thresholds.

Figure 5:
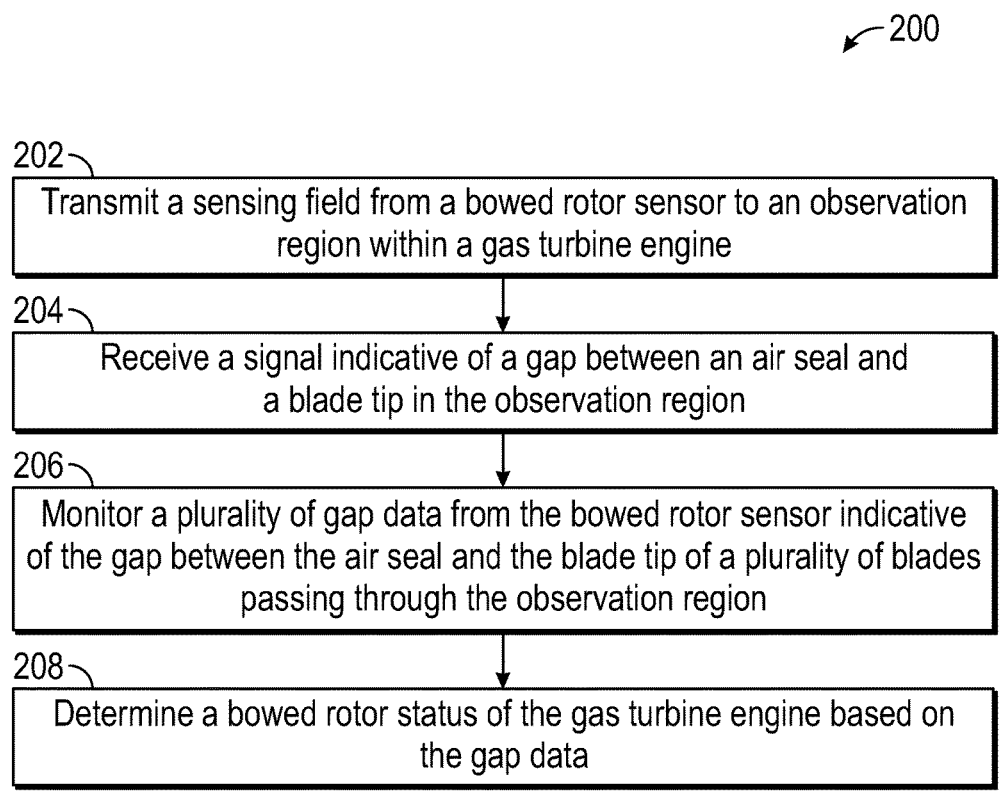
FIG. 5 is a process flow of a method according to embodiments of the disclosure.

FIG. 5 is a process flow of a method 200 according to an embodiment. The method 200 can be implemented by the bowed rotor sensor system 42 of FIG. 1 and/or bowed rotor prevention system 101 of FIG. 4, and thus FIG. 5 is described with reference to FIGS. 1-5. An engine shutdown condition of the gas turbine engine 10 can be detected, for instance, by the controller 102 while controlling operation of the gas turbine engine 10. The controller 102 can perform the method 200 to determine whether bowed rotor mitigation actions are needed. At block 202, a sensing field 80 is transmitted from bowed rotor sensor 64 to an observation region 82 within the gas turbine engine 10. At block 204, a signal is received by the bowed rotor sensor 64 indicative of a gap 85 between an air seal 84 and a blade tip 86 in the observation region 82. At block 206, controller 102 monitors a plurality of gap data from the bowed rotor sensor 64 indicative of the gap 85 between the air seal 84 and the blade tip 86 of a plurality of blades 21 passing through the observation region 82. At block 208, a bowed rotor status of the gas turbine engine 10 is determined based on the gap data.

The controller 102 can control the core turning motor 44 to rotate the turbomachinery of the gas turbine engine 10. The core turning motor 44 may rotate turbomachinery of the gas turbine engine 10 at a low speed (e.g., <5 RPM) while monitoring the bowed rotor sensor 64 until a threshold condition is met (e.g., a modulation amplitude threshold or minimum gap size threshold is met). Rotation may be substantially constant at about 0.1 RPM. Alternatively, the controller 102 can control the core turning motor 44 to drive rotation of the engine core for a partial rotation, for instance, by periodically performing a half revolution of the engine core and monitoring the bowed rotor sensor 64. The controller 102 can make the bowed rotor status available to one or more systems, e.g., an aircraft maintenance computer. If needed, the controller 102 can perform a dry motoring process on start-up when the controller 102 determines that the bowed rotor prevention process was not successful using the core turning motor 44. The bowed rotor sensor 64 can be monitored during dry motoring to determine when the bowed rotor condition has been sufficiently reduced or eliminated.

Technical effects and benefits include monitoring actual rotor blade condition by direct measurement to minimize engine start delays and reduce the risk of blade damage due to a bowed rotor condition.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A bowed rotor sensor system for a gas turbine engine, the bowed rotor sensor system comprising:
   a bowed rotor sensor operable to transmit a sensing field in an observation region and receive a signal indicative of a gap between an air seal and a blade tip within the gas turbine engine; and
   a controller operable to monitor a plurality of gap data from the bowed rotor sensor indicative of the gap between the air seal and the blade tip of a plurality of blades passing through the observation region and determine a bowed rotor status of the gas turbine engine based on the gap data, and the controller is operable to control rotation of the gas turbine engine based on the bowed rotor status until the gap data received from the bowed rotor sensor meets a modulation amplitude threshold.

2. The bowed rotor sensor system as in claim 1, wherein the bowed rotor sensor is installed in a borescope port of the gas turbine engine.

3. The bowed rotor sensor system as in claim 2, wherein the observation region is aft of the borescope port.

4. The bowed rotor sensor system as in claim 1, wherein the bowed rotor sensor is an optical, acoustic, or microwave sensor.

5. The bowed rotor sensor system as in claim 1, wherein the controller is operable to compare the gap data to a baseline data set to determine the bowed rotor status and collect a time history of the gap data.

6. The bowed rotor sensor system as in claim 1, wherein the controller is operable to control a starter of the gas turbine engine based on the bowed rotor status.

7. The bowed rotor sensor system as in claim 1, wherein the controller is operable to control a core-turning motor of the gas turbine engine based on the bowed rotor status.

8. A bowed rotor sensor system for a gas turbine engine, the bowed rotor sensor system comprising:
   a bowed rotor sensor operable to transmit a sensing field in an observation region and receive a signal indicative of a gap between an air seal and a blade tip within the gas turbine engine; and
   a controller operable to monitor a plurality of gap data from the bowed rotor sensor indicative of the gap between the air seal and the blade tip of a plurality of blades passing through the observation region and determine a bowed rotor status of the gas turbine engine based on the gap data, wherein the gap data modulates as a rotor comprising the blades rotates within the gas turbine engine based on a changing gap between the air seal and the blade tip of the blades.

9. The bowed rotor sensor system as in claim 8, wherein the controller is operable to monitor an amplitude of modulation of the gap data to determine the bowed rotor status.

10. The bowed rotor sensor system as in claim 8, wherein collection of the gap data is synchronized with respect to a once-per-revolution indicator of the rotor.

11. A method of bowed rotor sensing for a gas turbine engine, the method comprising:
    transmitting a sensing field from a bowed rotor sensor to an observation region within the gas turbine engine;
    receiving a signal indicative of a gap between an air seal and a blade tip in the observation region;
    monitoring, by a controller, a plurality of gap data from the bowed rotor sensor indicative of the gap between the air seal and the blade tip of a plurality of blades passing through the observation region;
    determining a bowed rotor status of the gas turbine engine based on the gap data; and
    controlling rotation of the gas turbine engine based on the bowed rotor status until the gap data received from the bowed rotor sensor meets a modulation amplitude threshold.

12. The method as in claim 11, wherein the bowed rotor sensor is installed in a borescope port of the gas turbine engine.

13. The method as in claim 12, wherein the observation region is aft of the borescope port.

14. The method as in claim 11, wherein the bowed rotor sensor is an optical, acoustic, or microwave sensor.

15. The method as in claim 11, further comprising:
    comparing the gap data to a baseline data set to determine the bowed rotor status; and
    collecting a time history of the gap data.

16. The method as in claim 11, further comprising: controlling a starter of the gas turbine engine based on the bowed rotor status.

17. The method as in claim 11, further comprising: controlling a core-turning motor of the gas turbine engine based on the bowed rotor status.

18. A method of bowed rotor sensing for a gas turbine engine, the method comprising:
    transmitting a sensing field from a bowed rotor sensor to an observation region within the gas turbine engine;
    receiving a signal indicative of a gap between an air seal and a blade tip in the observation region;
    monitoring, by a controller, a plurality of gap data from the bowed rotor sensor indicative of the gap between the air seal and the blade tip of a plurality of blades passing through the observation region;
    determining a bowed rotor status of the gas turbine engine based on the gap data; and
    observing a modulation of the gap data as a rotor comprising the blades rotates within the gas turbine engine, the modulation indicative of a changing gap between the air seal and the blade tip of the blades.

19. The method as in claim 18, further comprising: monitoring an amplitude of the modulation of the gap data to determine the bowed rotor status.

20. The method as in claim 18, wherein collection of the gap data is synchronized with respect to a once-per-revolution indicator of the rotor.

* * * * *